United States Patent [19]

Davis

[11] Patent Number: 5,016,925
[45] Date of Patent: May 21, 1991

[54] PIPE COUPLING AND METHOD OF FORMING

[76] Inventor: Paul K. Davis, 106 Holly Oak La., Alameda, Calif. 94501

[21] Appl. No.: 42,721

[22] Filed: Apr. 27, 1987

[51] Int. Cl.⁵ .............................................. F16L 17/02
[52] U.S. Cl. .................................... 285/363; 285/382; 29/508; 29/516; 29/451
[58] Field of Search ............... 285/363, 364, 365, 366, 285/367, 368, 382, 424, 903, 370; 29/508, 516, 451

[56] References Cited

U.S. PATENT DOCUMENTS

| | | | |
|---|---|---|---|
| 1,907,397 | 5/1933 | Kosik | 285/365 |
| 2,209,239 | 7/1940 | Sterzenbach | 285/382 |
| 2,490,907 | 12/1949 | Kellaher et al. | 285/27 |
| 2,716,579 | 8/1955 | Staak | 29/508 |
| 2,777,715 | 1/1957 | Beyer | 285/363 |
| 3,425,719 | 2/1969 | Burton | 29/516 |
| 3,477,750 | 11/1969 | Powell | 285/363 |
| 4,218,079 | 8/1980 | Arnoldt | 285/363 |
| 4,330,924 | 5/1982 | Kushner et al. | 29/508 |
| 4,513,488 | 4/1985 | Arena | 29/516 |

FOREIGN PATENT DOCUMENTS 88939 7/1980 Japan ..................................... 29/508

Primary Examiner—Dave W. Arola
Assistant Examiner—David J. Bartczak
Attorney, Agent, or Firm—Ernest M. Anderson

[57] ABSTRACT

A pipe coupling is described comprising a pair of flanged collars, each collar having a sleeve that fits within one end of a pipe and an integral radial flange that extends radially outward of the pipe section circumference. An annular ring gasket is formed or disposed around each sleeve and the gasket is lodged between the inside surface of the pipe and the sleeve. The end of each pipe section which receives the sleeve is then crimped to form indentations in the exterior surface of the pipe, said indentations compressing the gaskets and forming a watertight seal between the sleeves and the end of each pipe section.

11 Claims, 2 Drawing Sheets

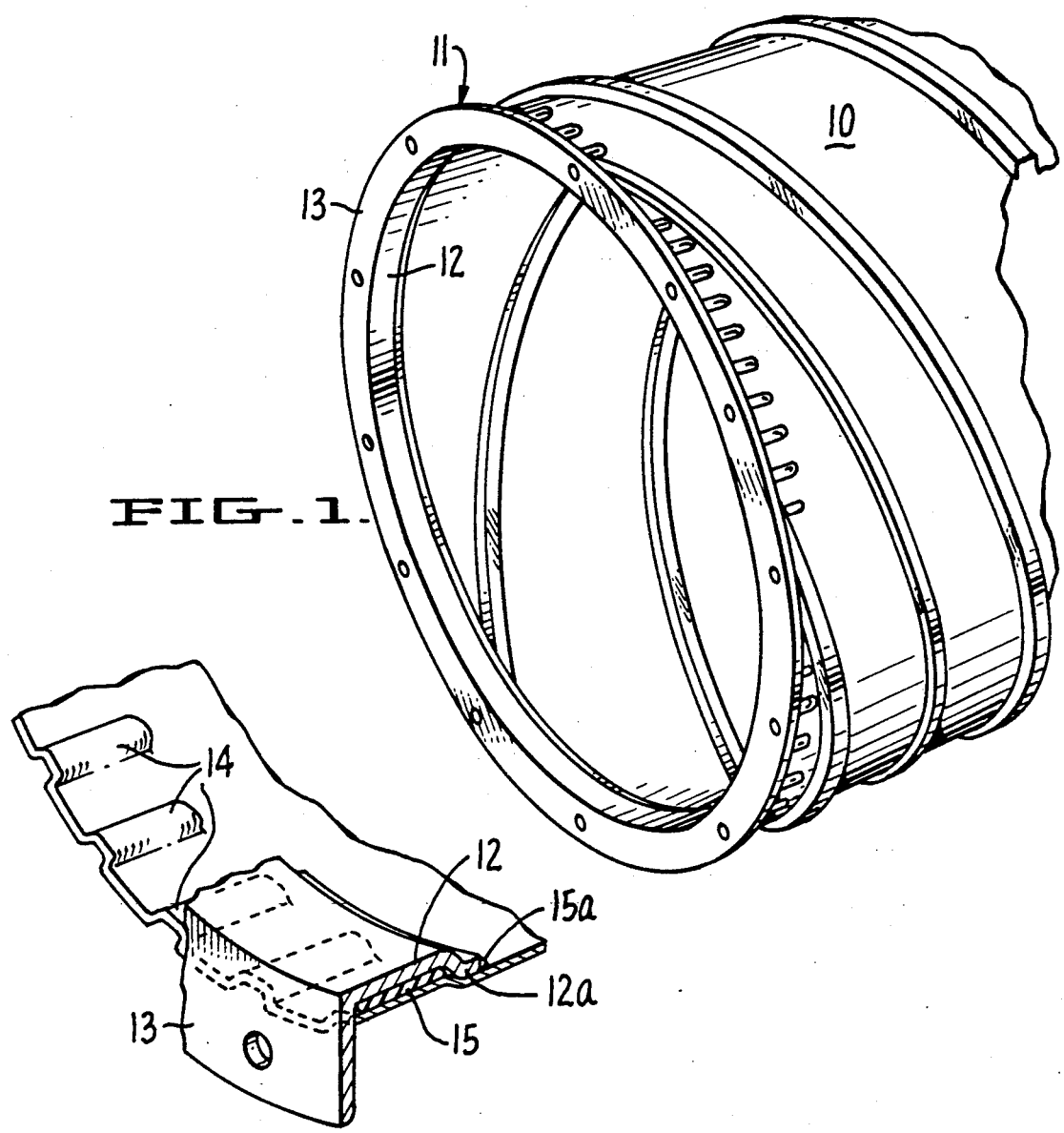
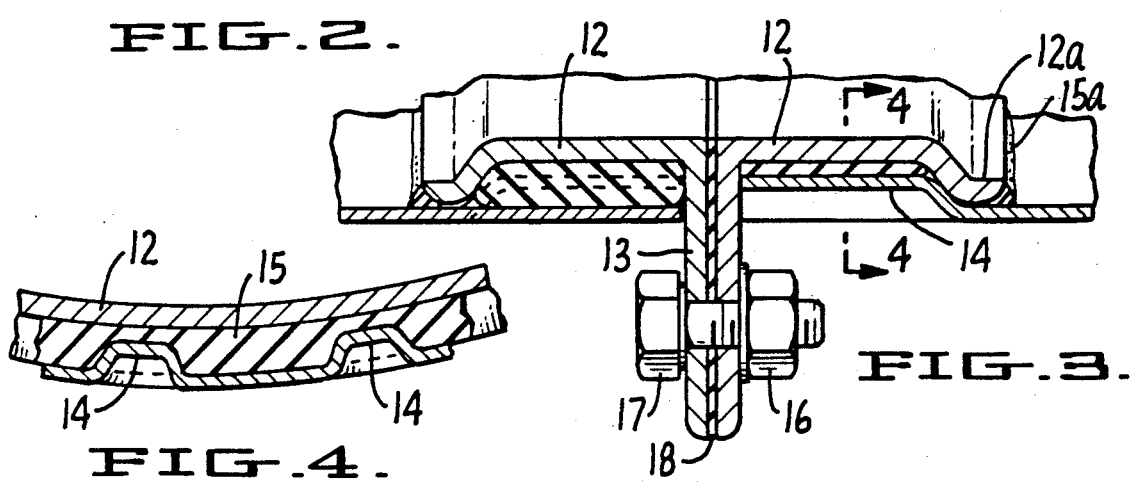

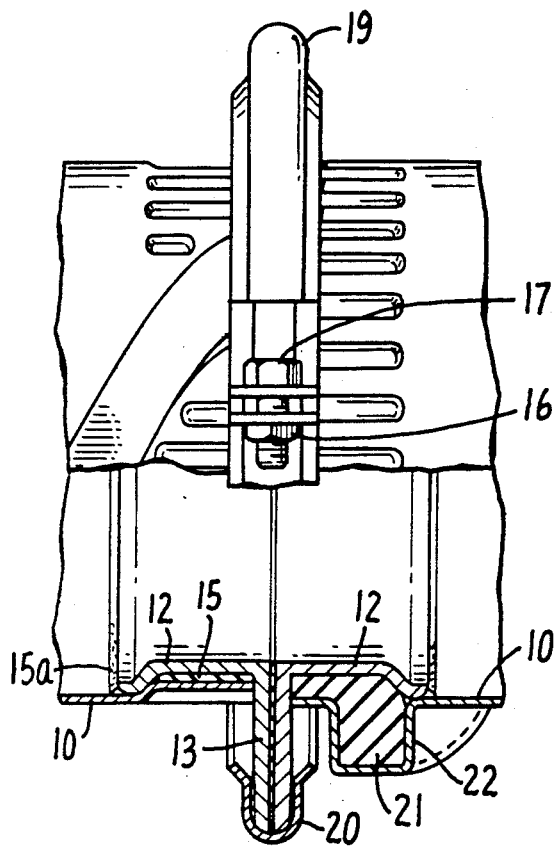
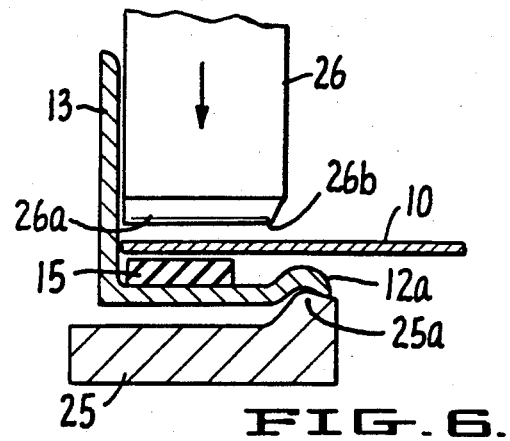
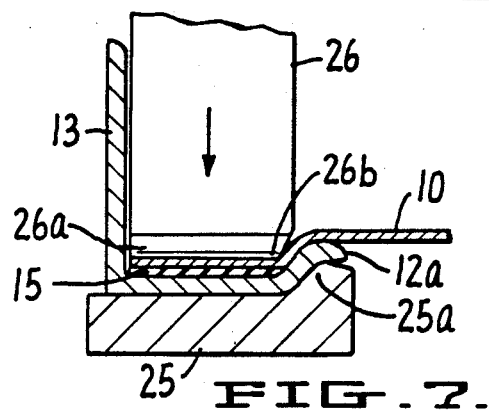
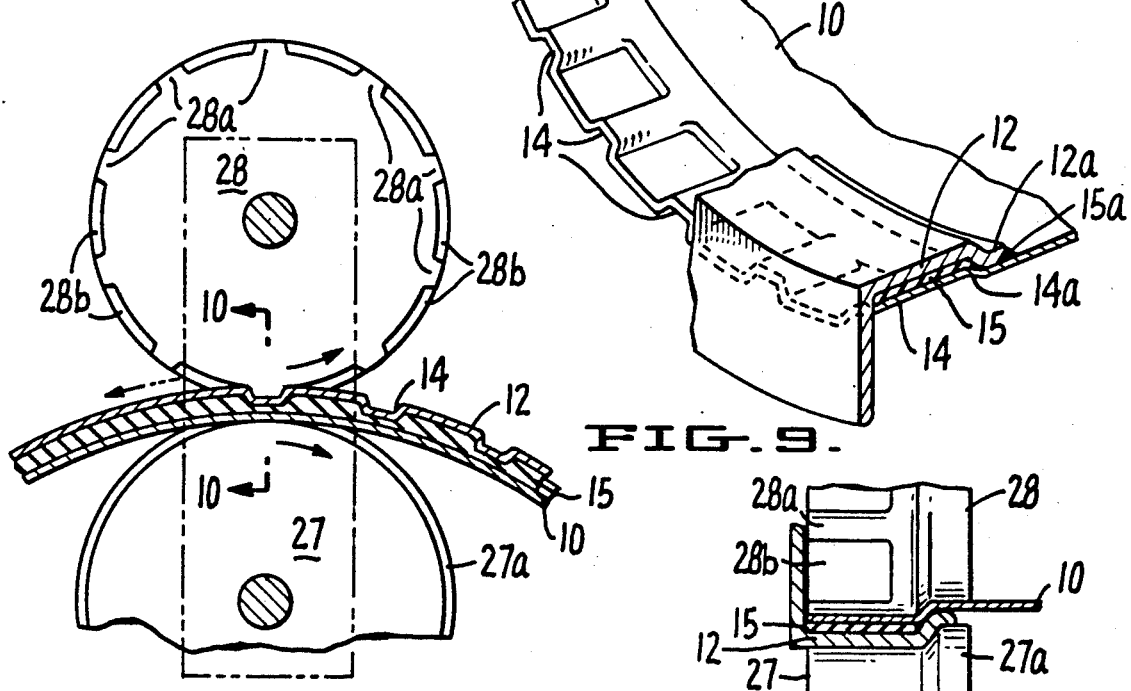

PIPE COUPLING AND METHOD OF FORMING

BACKGROUND OF THE INVENTION

For many years it has been common practice to couple two ends of corrugated metal pipe by wrapping the ends with some form of sheet metal band that is drawn up or tightened by means of bolts. This type of coupling has been used both with regard to circular and spiral formed corrugated metal pipe. With spiral formed pipe, however, the practice may include the step of reforming the pipe ends with angular reforming dies.

Within the past few years, a new pipe product, known as box rib or spiral ribbed pipe, has been developed. Such pipe constructions are reasonably smooth in the bore as compared with the standard corrugated metal pipe and consequently have less resistance to fluid flows. The couplings used for box rib or spiral ribbed pipe are largely those commonly employed for pipe having annular corrugations. This necessitates that the ends of the box ribbed pipe be reformed into an annular configuration, just as the spirally corrugated pipe has been reformed. But the box rib or spiral rib pipe does not reform well. The size and the amount of metal that exists in the box rib portion of the pipe creates distortions. Reforming is not only expensive but difficult to accomplish to provide a watertight coupling between ends of two pipe sections.

Some manufacturers have avoided the problem of reforming by welding a flanged collar onto the ends of the pipe sections, then connecting the flanged portions of each flanged collar together by means of bolts or bands. Until now that practice has been the only practical method for coupling box rib or spiral rib metal pipe, particularly where a watertight joint is specified. But it is also recognized in the pipe industry that the cost of welding flanges to galvanized steel and aluminum pipes is very high, and it requires a great deal of patience and talent to accomplish an acceptable weld.

SUMMARY OF THE INVENTION

A primary purpose of this invention is to provide a coupling for pipe sections that can be mechanically applied in the field without welding and which provides an acceptable water-tight seal. In brief, a coupling is provided comprising a pair of flanged collars, each collar having a sleeve that fits within one end of a pipe and an integral radial flange that extends radially outward of the pipe section circumference. An annular ring gasket is formed or disposed around each sleeve and the gasket is lodged between the inside surface of the pipe and the sleeve. The end of each pipe section which receives the sleeve is then crimped to form indentations in the exterior surface of the pipe, said indentations compressing the gaskets and forming a watertight seal between the sleeves and the end of each pipe section.

In the preferred form of the invention, the ends of the sleeves are formed with an out-turned lip that provides a contact with indentations formed in the ends of the pipe sections, thus preventing axial removal of the sleeve from the pipe section. Conventional means, such as bands or bolts, are then employed for connecting the radial flanges of a pair of flanged collars already secured to a pair of pipe sections in the manner described.

Various objects in addition to those described above will become apparent in view of the following detailed description and the accompanying drawings.

DESCRIPTION OF THE DRAWINGS

In the drawings forming a part of this application and in which like parts are identified by like reference numerals, FIG. 1 is a perspective view of one end of a spiral ribbed pipe having secured thereto a flanged collar as one preferred embodiment of the invention;

FIG. 2 is an enlarged detail and perspective view of a section of the flanged collar shown in FIG. 1;

FIG. 3 is a longitudinal section taken through one side of a pipe coupling using the flanged collar shown in FIGS. 1 and 2;

FIG. 4 is a detail and section taken on the lines 4—4 of FIG. 3;

FIG. 5 is a side elevation and partial section of a pipe coupling utilizing the flanged collars of FIGS. 1 and 2 and an annular band for connecting the flanges of two pipe sections;

FIGS. 6 and 7 are sections that illustrate the use of forming dies to form indentations in the exterior surface of the ends of pipe sections while simultaneously deforming the ends of the sleeve portion of flanged collars;

FIG. 8 illustrates a pair of roller dies for forming indentation int he exterior surface of the pipe;

FIG. 9 is a perspective view and partial section of a flanged collar connected to the end of a pipe section with indentations as shown in FIGS. 6-8; and FIG. 10 is a section taken on the line 10—10 of FIG. 8

DESCRIPTION OF THE PREFERRED EMBODIMENTS

Referring to FIG. 1, there is shown one end of a spiral ribbed pipe 10 having secured thereto a flanged collar 11 formed with a sleeve 12 that fits within the end of the pipe and an integral radial flange 13 which extends radially outward from the pipe section circumference. Flanged collar 11 is secured to the end of pipe section 10 by crimping the exterior surface of the pipe to form indentations 14. However, prior to crimping, a gasket 15 is placed around sleeve 12 and the sleeve (with gasket) is fitted into the end of pipe section 10. Crimping the exterior surface of the pipe simultaneously compresses gasket 15 and reduces the circumference the pipe in the area of indentations.

Referring to FIGS. 2, 3 and 4, and the end of sleeve 12 is formed with a lip 12a that projects radially outward relative to the inner surface of indentations 14. As a consequence, contact is made therebetween which prevents axial removal of the sleeve from the pipe section. The preferred embodiment of the invention further provides an annular seal 15a at the end of lip 12a. Seal 15a is formed by the application of a sealant between lip 12a and the inner surface of the pipe after crimping.

Indentations 14 are preferably formed circumferentially of each pipe section in a regular pattern. Each indentation 14 extends parallel to the axis of the pipe section such that the end of the pipe is uniformly reduced in size in the axial region of indentations.

FIG. 3 illustrates a coupling of two flanges by means of nuts 16 and bolts 17. As indicated above, this is one common means known to the prior art for joining two flanges of pipe section. It is also common practice to provide a ring gasket 18 between flanges of the flanged collars 11.

FIG. 5 illustrates a second method commonly used for coupling a pair of flanges secured to spiral ribbed pipe. Here there is shown a pair of arcuate bands 19 and 20 joined at their ends by nut and bolt means 16 and 17. A partial section of the coupling, shown in the lower half of FIG. 5, also demonstrates the use of a plug-like sealant 21 disposed within the spiral rib 22. Sealant 21 is preferably applied prior to installation and crimping of the flanged collar.

Referring to FIGS. 6 and 7, pipe sections 10 may be crimped onto the sleeve of a flanged collar 11 by the use of an inner die 25 and an outer die member 26. Inner die 25 is formed with a ridge 25a which engages lip 12a during crimping, bending the lip backward behind indentations 14 formed in the end of pipe 10.

Outer die 26 is generally rounded at its lower end 26a and preferably higher and tapered at 26b for improving a rounded contact between lip 12a and indentations 14 as they are formed.

FIGS. 8 through 10 illustrate a further embodiment of the invention in providing a crimping connection that comprises an annular, substantially continuous indentation 14a as well as a plurality of indentations 14, best shown in FIG. 9. Annular indentation 14a connects with one end of each indentation 14.

The pattern of indentations shown in FIG. 9 may be accomplished with a pair of roller dies 27 and 28, shown in FIG. 8. Roller die 27 is formed with a ridge 27a that contacts lip 12a to press it outward—as does the raised portion 25a of die 25. Roller die 28 is formed with a plurality of peripheral ridges or hobs 28a spaced angularly equal distances around the die. Intermediate each adjacent pair of ridges, and located at one end, are interconnecting ridge portions 28b. The combination of ridges 28a and 28b create the pattern of indentations 14 and 14a, shown in FIG. 9, as dies 27 and 28 rotate upon their axes. It is to be understood that roller dies 27, 28 are mounted as an assembly that rotates about the axis of pipe 10. As shown, the dies are in a crimping relationship but can be radially separated for engaging and disengaging the pipe and flanged collar.

Although preferred embodiments of the invention have been illustrated and described, various modifications and changes may be resorted to without departing from the spirit of the invention or the scope of the appended claims, and each of such modifications and changes is contemplated.

What is claimed is:

1. A coupling for joining the ends of two pipe sections comprising a pair of flanged collars, each collar having a sleeve that fits within one end of a pipe and an integral radial flange that extends radially outward of the pipe section circumference; a pair of gaskets, one gasket being disposed around each sleeve between the inside surface of the pipe and the sleeve, the ends of each pipe section being crimped to form indentations in the exterior surface, said indentations compressing said gaskets and forming a seal between said sleeves and the end of the pipe sections; contact means between said sleeves and indentations to prevent axial removal of said sleeves from said pipe sections; and means for sealingly connecting the radial flanges of said pair of flanged collars.

2. The coupling of claim 1, said indentations being formed circumferentially around the ends of the pipe sections in a regular pattern, each indentation extending parallel to the axis of each pipe section, whereby the ends of said two pipe sections are uniformly reduced in size.

3. The pipe coupling of claim 2, the end of each sleeve being formed with a lip of greater diameter that contacts the inner surface of a pipe section, said regular pattern of indentations extending into the space between said flange and lip.

4. The pipe coupling of claim 2, and further including an annular, substantially continuous indentation formed in the end of each pipe section proximate to the end of each sleeve portion.

5. The pipe coupling of claim 4, the end of each sleeve portion being formed with a lip of greater diameter that contacts the inner surface of a pipe section in back of said annular, substantially continuous indentation, said regular pattern of indentations extending into the space between said flange and lip.

6. The pipe coupling of claims 3 or 5, and a sealant applied circumferentially within each pipe section at the contact between said lip and inner surface of a pipe section.

7. The pipe coupling of claims 1, 2, 3, 4 or 5, the end of each pipe section terminating with a spiral rib that projects radially outward from the circumference of non-rib portions of the pipe, said rib defining a trough, and a plug sealant disposed in the trough of said rib.

8. A method for securing a flanged collar to the end of a pipe section, said flanged collar having a flange that projects radially from one end of a sleeve, said method comprising the steps: mounting a gasket circumferentially of the sleeve; inserting the sleeve with gasket thereon into the end of the pipe section; crimping the end of the pipe section circumferentially to form indentations in its exterior surface, thereby compressing the gasket to form a seal between the sleeve portion and pipe section; and deforming the end of the sleeve radially outward to form a lip in back of the indentations while crimping the end of the pipe section radially.

9. The method of claim 8, said crimping being done to form a regular pattern of indentations that extend parallel to the axis of the pipe section.

10. The method of claims 8 or 9, said crimping including the formation of an annular, substantially continuous indentation proximate to the end of each sleeve.

11. The method of claim 8, said crimping including the formation of an annular substantially continuous indentation proximate to the end of each sleeve, the end of the sleeve being deformed radially outward to form a lip in back of and in contact with the annular, substantially continuous indentation while crimping the end of the pipe section to form the annular substantially continuous indentation.

* * * * *